United States Patent [19]

Kilgore

[11] 4,175,517
[45] Nov. 27, 1979

[54] CAT PROOF PIGEON TRAP

[76] Inventor: Doyle G. Kilgore, 1303 Gober St., Houston, Tex. 77017

[21] Appl. No.: 929,934

[22] Filed: Aug. 1, 1978

[51] Int. Cl.² .............................................. A01K 29/00
[52] U.S. Cl. .................................................... 119/155
[58] Field of Search ............... 119/47, 50, 155; 43/71, 43/74

[56] References Cited

U.S. PATENT DOCUMENTS

| | | | |
|---|---|---|---|
| 1,301,660 | 4/1919 | DeCorte | 119/50 X |
| 2,518,588 | 8/1950 | Allen | 119/50 |
| 2,682,726 | 7/1954 | Gustin | 43/61 |
| 3,016,878 | 1/1962 | Kallal | 119/155 |

*Primary Examiner*—Russell R. Kinsey
*Assistant Examiner*—Robert P. Swiatek
*Attorney, Agent, or Firm*—Roy Hammond Smith, Jr.

[57] ABSTRACT

A pigeon trap including a two-level walkway and a locking mechanism barring entry of animals such as house cats and other predatory quadrupeds of comparable size. The upper level walkway is or is covered by a hinged deck plate which remains in a tilted, off-horizontal position as long as there is no weight on it, and in this position it exerts an upward force on one end of a pivoted balance beam through a rod connecting the two members. This causes the opposed end of the balance beam to be depressed, thereby freeing the lower ends of the pivotally mounted bobs which would otherwise be locked in place by the balance beam. In this position of the members, a pigeon standing on the lower level walkway can push the bobs out of his way and fly into the loft.

The hinged deck plate will be depressed when any animal weighing less than the average pigeon walks on it, depressing the adjacent end of the balance beam and causing the far end to be raised, in which position the lower ends of the bobs enter registering holes in the far end of the beam, locking the bobs in place. This creates no problem for the pigeon, because as soon as he jumps to the lower level, the hinged plate springs upward, again freeing the bobs. The lower level is too small, however, to accommodate the full weight of a house cat, who can get his forelegs onto the lower level but must keep the rest of his body on the upper level, thus keeping the plate depressed and keeping the bobs locked in place like the bars of a prison cell.

4 Claims, 5 Drawing Figures

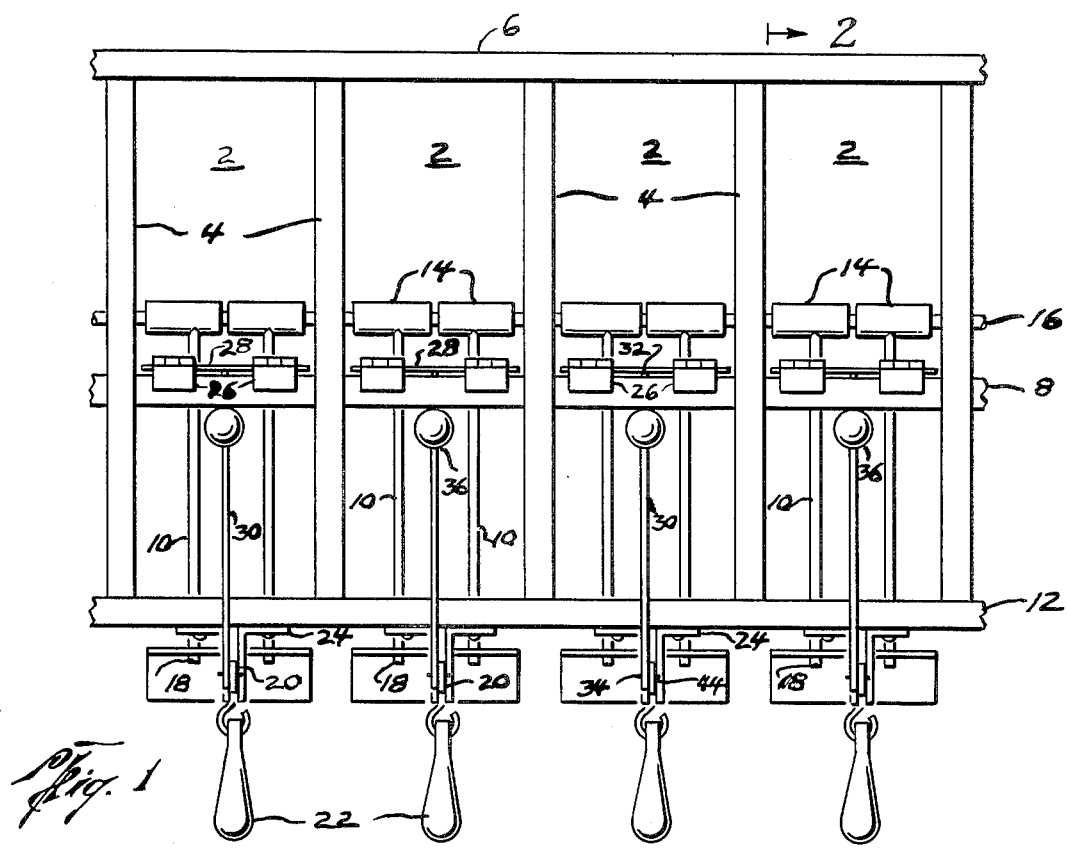
Fig. 1
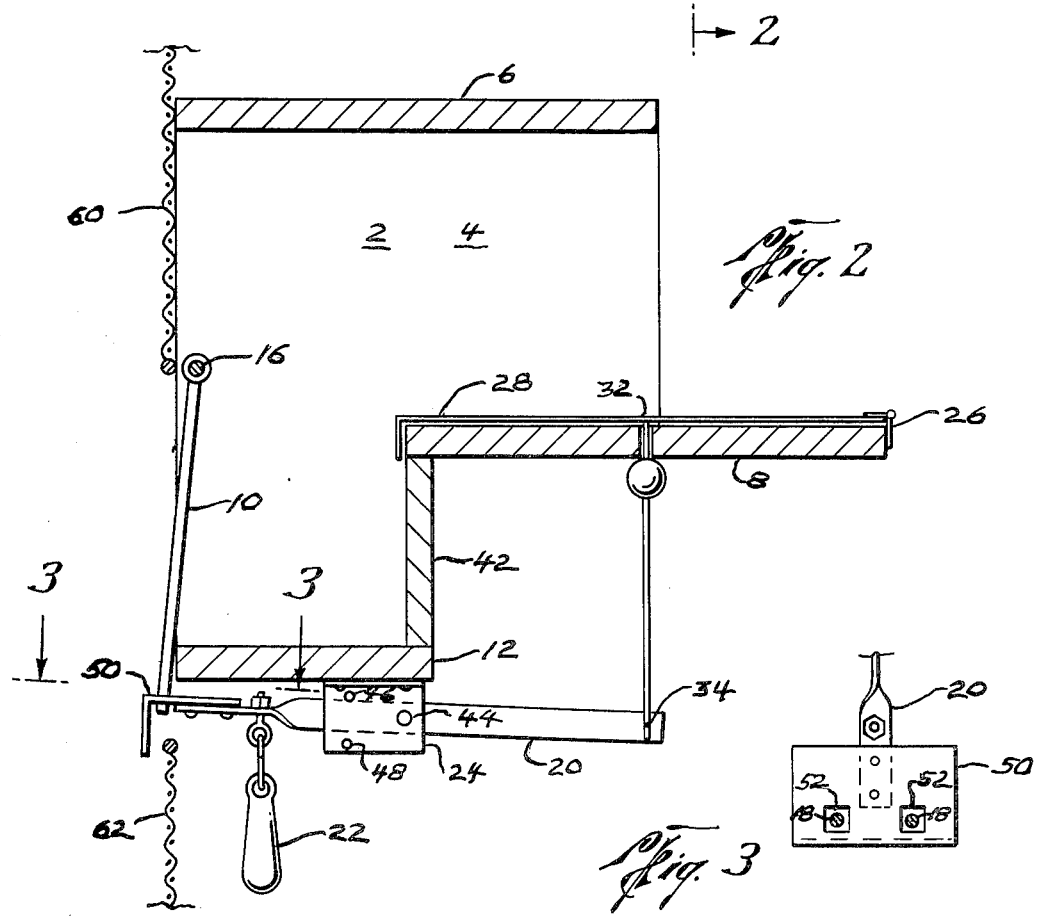
Fig. 2
Fig. 3

CAT PROOF PIGEON TRAP

FIELD OF INVENTION

The present invention lies generally in the fields of pigeon lofts, and more specifically in the traps for such lofts. Even more specifically, the invention is directed to a pigeon trap which is automatically operable to exclude domestic cats and other four-legged varmints.

PRIOR ART

In the usual or common pigeon trap, the bird alights on an uncovered walkway or perch extended into the atmosphere, walks down the walkway to a covered area and thence to the aviary end of the walkway, where it confronts a number of vertical bars or "bobs". Such bobs are pivoted on a horizontal pin disposed well above the walkway, and their unattached lower ends swing down and touch the inner or aviary end of the walkway. The returning pigeon pushes against the bobs and takes off on a short flight to the floor of the aviary. It can not follow the same course in reverse to depart the loft, as the bobs will not rotate in the reverse direction from their normal vertical position. To leave the aviary the pigeon must be allowed access to the open air through an opening which is closed or opened at the will of the pigeon fancier.

Insofar as known, no pigeon fancier has developed an automatic means for locking out such pests as domestic cats when he is absent from the scene. Either the owner keeps someone available to shoo off the pests, or he blocks access to the walkways by a cover which shuts off all entry, by birds as well as by pests.

SUMMARY OF THE INVENTION

The present inventor lives in an area which is replete with household cats who regard pigeons as their natural enemies. He was further faced with the facts (1) that he and all members of his household are absent from their home location near the pigeon loft for several hours each day, and (2) during such hours, there frequently are homebound pigeons seeking to enter the loft. He thus found it highly desirable to devise some automatic means to let the good guys in but shut out the bad guys.

The trap of the invention is based primarily on the fact that a pigeon has only two feet and a body which, when in standing position, is relatively short from beak to tail, whereas a cat, on the other hand, has four legs and a relatively elongated body. These facts were utilized in a structure wherein the pigeon walkway is divided into two discrete parts, an outer walkway next to the alighting area and an inner walkway next to the aviary at the center of the loft. The outer walkway is pivotally mounted whereas the inner walkway is fixed, and the inner walkway is limited in the walkthrough dimension, as well as the transverse direction, to accommodate a single pigeon.

The outer walkway assumes a normally tilted position when there is no weight resting on it, and in such tilted position it has no effect on the bobs at the inner end of the inner walkway, leaving them free to be pushed aside by the thrust of a pigeon. When even a small weight (less than the average weight of a pigeon) rests on the outer walkway, it pivots to a flat position, resting against a horizontal surface of the fixed structure. In so doing, it pushes down a connecting rod which has its opposed end connected to a generally horizontal balance beam which is pivotally mounted below the walkway. Such outer end of the balance beam is depressed by the connecting rod, and the opposed end of the beam is elevated so that a number of holes therein receive and surround the lower ends of the bobs, effectively locking them in a no-access position.

This presents no problem to the returning pigeon, who simply steps from the outer walkway to the inner walkway. As its weight is removed from the outer walkway, the latter pivots back into its tilted position, rotating the balance beam in the opposite direction. The inner end of the balance beam is depressed to lose contact with the bobs, freeing the bobs to be pushed out of the way as the pigeon comes home to the aviary.

When a domestic cat or wild quadruped attempts to follow the same pathway, it can get its forelegs onto the inner walkway, but the area and space are too confined to receive its entire body. The rear legs and a part of the animal's weight continue to rest on the outer walkway, maintaining it in its depressed position. The cat finds itself unable to get into the aviary and must back out of the walkway.

BRIEF DESCRIPTION OF THE DRAWING FIGURES

The invention may perhaps be better understood by referring to the accompanying drawing forming a part of the present application and illustrating one preferred embodiment of the invention. In the drawing:

FIG. 1 is a rear elevation of a portion of a pigeon trap showing a multiplicity of stalls, the orientation being from the viewpoint of a returning pigeon.

FIG. 2 is a side elevational section of a single stall, as indicated by the sectioning lines and arrows labeled "2—2" in FIG. 1.

FIG. 3 is a partial plan view taken along line "3—3" of FIG. 2 showing the inter-engagement of the inner end of the balance beam and the bobs engaged by it.

DESCRIPTION OF ONE PREFERRED EMBODIMENT

Figure 4:
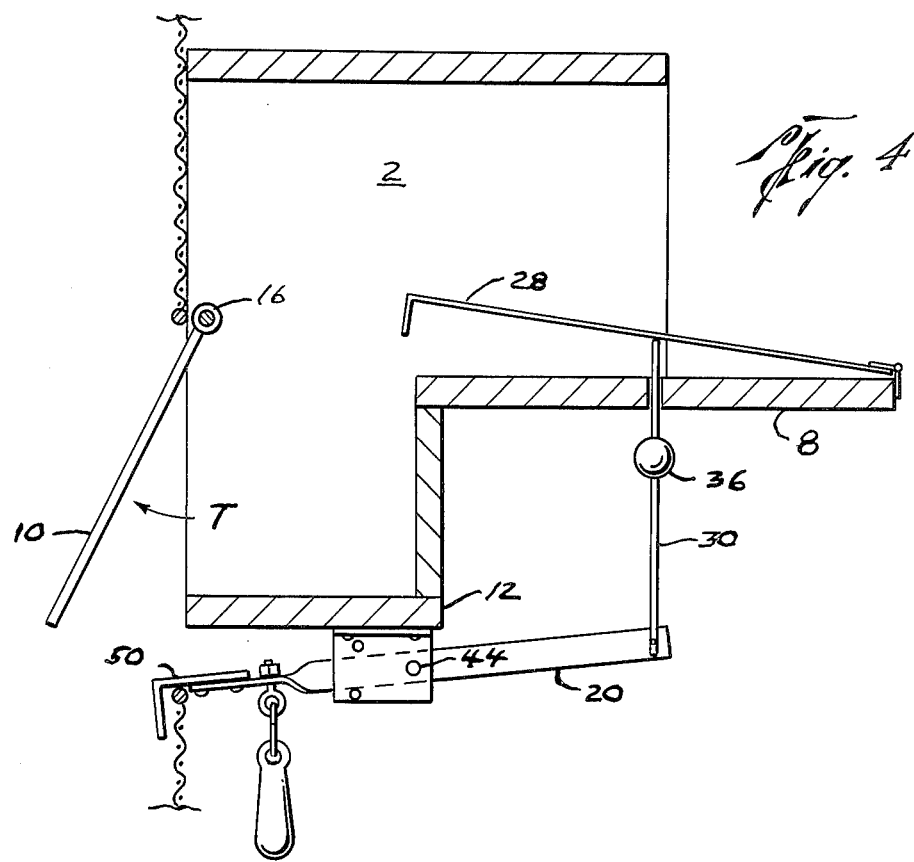
FIG. 4 is an elevation like FIG. 2, but showing the relative disposition of the parts in the position they would occupy when there is no animal on the outer walkway and a pigeon standing on the lower or inner walkway is pushing against the pivoted bobs to make his way into the aviary.

FIG. 1 is a rear elevation of the trap portion of a loft, looking into the same as would a pigeon on a return flight, just before alighting. The four stalls 2 are separated from each other by the vertical party walls 4, are completely open at the ends nearer the observer, and are open-ended at the distant end except for the bobs 10. The common roof 6, outer walkway support 8, and inner walkway 12 are fixed structural members which may be made of metal, wood, etc.

Each bob 10 is normally disposed vertically and has a hub 14 at its upper end rotatably mounted on a common shaft 16. The lower ends 18 of the bobs, which are normally disposed vertically, extend below and in front of the inner walkway 12, and, in certain positions of the balance beam 20, are engaged in openings through such beam, as indicated in FIG. 1. Weights 22 indicated in FIG. 1 are part of the balance beam, and the brackets 24 secured to the underside of the inner walkway 12 are the means for pivotally supporting the balance beam 20. This figure also indicates the deck plate or outer walkway 28 in each stall which is pivotally supported by hinges 26 to the rear end of the ouer walkway support 8. Each locking assembly also includes a connecting rod 30 which is generally vertically disposed. The upper end of rod 30 is pivotally connected at its upper end 32 to the deck plate 28 and is pivotally connected at its lower end 34 to the outer end of the balance beam 20. On each connecting rod 30 there is a ball 36 which is manually movable to an infinite number of positions along the rod and remains in the set position until moved again. In the posture of the parts shown in FIGS. 1 and 2, ball 36 has been moved up to contact the nether side of outer walkway support 8, in which position it pulls the tiltable deck plate 28 tightly against the upper side of outer walkway 8 and in so doing elevates the inner end of the balance beam 20 to engage the lower ends 18 of bobs 10 to essentially lock the entire stall. Although birds and animals can enter the walkways, nothing can force the bobs 10 out of their locked position. This position of the parts might be used, for instance, when all birds are in the aviary or when the trap is being transported.

FIG. 2 is a side elevation section through a single stall 2, and better illustrates the operation of the locking mechanism. This figure shows a structural member which has been omitted from FIG. 1 for clarity, namely the vertical wall 42 connecting the inner walkway 12 with the outer walkway 8. Parenthetically, it may be noted that although the outer walkway 8 is shown elevated above the inner walkway 12, there is no reason why these positions cannot be reversed, and no reason why they cannot be on substantially the same plane. A pigeon will either jump to a lower level or fly to a higher level, and when he is seeking to enter his roost, he will advance up to the bobs 10 whether the inner walkway is on the same level with the outer walkway or not.

As shown in FIG. 2, balance beam 20 is pivotally supported at approximately its mid-point on the pivot pin 44 for limited rotation about a horizontal axis, the movement thereof being limited by stop pins 46 and 48. The weight 22 is secured to the forward or inner portion of the balance beam 20 to effect the desired balance, although, of course, many different arrangements of these parts are possible to achieve the same effect. At the forward end of balance beam 20, a plate 50 is secured to the balance beam, this member 50 extending transversely of the beam on both sides and having therein a pair of openings 52 to accommodate the lower ends 18 of bobs 10. The screen 60 shown in this figure is not actually necessary to prevent animals from entering the aviary (located to the left of 60 and 10 in FIG. 2), as the pivot pin 16 may be located higher than shown in the figure to block off the space above the bobs 10. Similarly, the lower screen 62 is not essential but may keep birds from becoming entangled in the mechanism below the walkway.

FIG. 2 might be said to represent the relative positions of all the parts of the trap at the time it is first put together and installed on the pigeon fancier's loft, with ball 36 raised against outer walkway 8 to pull the deck plate member 28 firmly against horizontal member 8 and at the same time to immobilize the bobs 10 and the entire locking mechanism. Thereafter, ball 36 would be relocated farther down the connecting rod 30, as shown in FIG. 4. This permits the small amount of rotation of the balance beam 20 to the position indicated in FIG. 4, which is the normal position of all parts when there is no weight resting on the deck plate 28. The plate 50 on the inner end of the balance beam is moved to the depressed position illustrated, freeing the bobs 10 so that they can be swung outwardly by a thrust T, for instance, as a pigeon would apply such thrust with its body when seeking to move from the inner walkway 12 to fly into the aviary. When no bird is present on inner walkway 12, bob 10 would swing to a vertical position in which its lower end 18 would rest against the inner end of the inner walkway 12.

Figure 5:
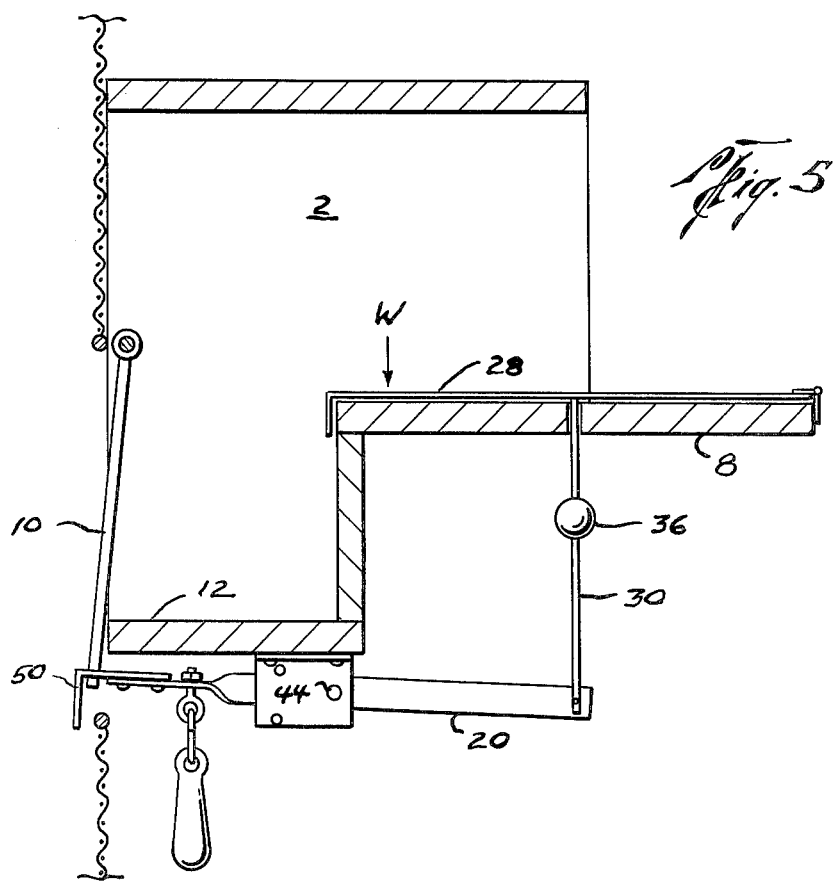
FIG. 5 is like FIGS. 2 and 4 but shows the relative disposition of the parts when an animal is exerting some weight on the outer walkway.

Thereafter, a pigeon or other animal may enter and walk upon the outer walkway member, in the course of which its feet must necessarily contact the hinged deck plate 28. This will cause the parts to assume the relative disposition shown in FIG. 5, in which a weight W is applied to 28 and swings it down to a position of contact with the outer walkway number 8. The connecting rod 30 is pushed downwardly, returning the balance beam 20 to a nearly horizontal position and elevating the plate 50 at its inner end. As it swings outwardly to the position shown in FIG. 5, the plate 50 or rather the pair of holes 52 therein surround the lower ends 18 of the pair of bobs 10 (which are all that are necessary in a single pigeon stall), ensuring that the bobs will remain in the closed vertical position and prevent any animal from entering the aviary to the left of the bobs. If it is a pigeon causing the deck plate 28 to be depressed, it would proceed to the inner walkway 12, releasing the mechanism so that it can return to the positions indicated in FIG. 4, with the deck plate raised and the balance beam rotated to free bobs 10. Thereafter, the pigeon can push the bobs open, as illustrated in FIG. 4, and enter the aviary. If it happens to be a domestic cat that has caused deck plate 28 to lock the mechanism, the cat can only proceed partially onto the inner walkway 12; a portion of its body and a portion of its weight are necessarily still resting on the deck plate 28, ensuring that it will keep the deck plate in the position shown in FIG. 5, and locking the bobs 10 in place to bar the animal from proceeding into the aviary.

Now that one preferred embodiment of the locking mechanism stall has been described, many variants thereof will be apparent to those of average skill in the art. Basically, all that is required is to divide the pigeon walkway into an outer walkway where the bird alights and an inner walkway which he must pass over to reach the bobs, push them aside and enter the aviary. The outer walkway or a deck plate thereon is pivoted to have a normally tilted position in which it is connected to a balance beam and in which position the balance beam is caused to assume a position in which it is disengaged from the bobs so that they can be pushed aside. The balance beam is so arranged that, as soon as a light weight, lighter than the average weight of a pigeon, is placed on the deck plate, it is depressed and in so doing, rotates the balance beam to a position in which it engages the bobs and locks them against any movement out of their vertical or locking position. The inner walkway is made just large enough to accommodate a single pigeon, and when thus dimensioned it can only partially accommodate a predator such as a domestic cat. The balance of the cat's weight must rest on the deck plate, keeping it in the position such that it rotates the balance beam into a position wherein it engages and locks the bobs in position so that such predator cannot enter the aviary. It is to be understood that the invention shall not be considered limited to the particular preferred embodiment illustrated and described, but that the invention embraces all equivalent mechanisms operating in substantially the same manner to obtain substantially the same results, and should be construed only in accordance with the following claims.

What is claimed is:

1. A pigeon trap comprising a walkway divided into an outer walkway having an outer end open to the atmosphere and an inner walkway having an inner end open to an aviary except for the usual bobs pivotally suspended from a horizontal pin disposed above such inner end, such bobs normally hanging approximately vertically and having free lower ends, a balance beam extending below both said walkways and pivotally mounted proximate its midpoint with an outwardly extending portion having its end connected to said outer walkway by a connecting rod and its inwardly extending portion having an end provided with a number of through openings registering with and adapted to receive the lower ends of said bobs, said outer walkway being pivoted and having a normally raised position when no weight rests on it and a depressed position when a weight less than that of the average pigeon does rest on it, whereby when there is no weight on the outer walkway it assumes its raised position and it acts on said balance beam through the connecting rod to raise the outer end of the beam and depress the inner end of the beam to keep such inner end spaced away from the lower ends of the bobs and allow a pigeon standing on the inner walkway to push the bobs out of its way so that it can pass by them into the aviary, and when a pigeon or other animal rests a portion of its weight on the outer walkway, such outer walkway assumes its depressed position and rotates the balance beam so that its outer end is depressed and its inner end is raised to engage said lower ends of the bobs and lock said bobs against rotation.

2. The pigeon trap of claim 1 in which a ball is mounted on said connecting rod and is manually movable thereon between a free position in which it has no effect on the trap and an engaged position corresponding to the depressed position of the outer walkway, the ball in its engaged position locking the outer walkway in said depressed position.

3. The pigeon trap of claim 1 in which said outer walkway comprises a fixed member having a generally horizontal upper surface and a pivotal deck plate member constituting the walkway actually contacted by the feet of the pigeons and other animals using the trap, said deck plate having a tilted position relative to the fixed member constituting said raised position and a flat or depressed position in which it lies on and is parallel to said horizontal surface.

4. An automatic locking mechanism for a pigeon trap comprising a deck plate pivotally mounted on the outer portion of a walkway of said trap, leaving an inner portion of said walkway just large enough to accommodate a standing pigeon, said deck plate having a normal tilted position and a flat position against the walkway when weighted down by a pigeon, a connecting rod having an upper end connected to said deck plate and extending through said walkway and below the same to a lower end, a balance beam pivotally mounted below the trap at about its midlength, the outer portion of the balance beam being connected to said lower end of the connecting rod and the inner portion of the beam extending below the bobs of said trap and having a number of vertical apertures registering with and adapted to receive the usual number of vertical bobs having upper ends which are mounted for rotation about a horizontal pin secured above the inner end of the walkway and having free ends which contact said inner end and extend below it, said balance beam having a locking position when said deck plate is in its flat position, in which locking position said apertures receive the lower ends of the bobs and prevent them from being moved, and an anti-locking position when said deck plate has been rotated to its tilted position to rotate the balance beam and lower said inner end of the balance beam to clear said lower ends of the bobs.

* * * * *